United States Patent
Bharghavan et al.

(10) Patent No.: US 8,238,834 B1
(45) Date of Patent: Aug. 7, 2012

(54) DIAGNOSTIC STRUCTURE FOR WIRELESS NETWORKS

(75) Inventors: Vaduvur Bharghavan, Morgan Hill, CA (US); Jari Malinen, Santa Clara, CA (US); Dhaval Deshmukh, Bangalore (IN); Mohan Ram Bhadravati, Bangalore (IN); Mohamad Thaga, Tamil Nadu (IN)

(73) Assignee: Meru Networks, Sunnyvale, CA (US)

( * ) Notice: Subject to any disclaimer, the term of this patent is extended or adjusted under 35 U.S.C. 154(b) by 636 days.

(21) Appl. No.: 12/388,346

(22) Filed: Feb. 18, 2009

Related U.S. Application Data (63) Continuation-in-part of application No. 12/208,924, filed on Sep. 11, 2008.

(51) Int. Cl.
*H04B 17/00* (2006.01)

(52) U.S. Cl. .......... 455/67.11; 455/404.2; 455/423; 379/1.01; 379/27.01

(58) Field of Classification Search ........... 455/67.11, 455/423, 424; 379/1.01, 27.01, 29.01
See application file for complete search history.

(56) References Cited

U.S. PATENT DOCUMENTS

| | | | |
|---|---|---|---|
| 5,038,151 A | 8/1991 | Kaminski | |
| 5,337,397 A | 8/1994 | Lebby et al. | |
| 5,966,094 A | 10/1999 | Ward et al. | |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,319,685 B2 | 1/2008 | Kim et al. | |
| 7,333,455 B1 | 2/2008 | Bolt et al. | |
| 7,339,915 B2 * | 3/2008 | Jakkahalli et al. | 370/338 |
| 7,359,362 B2 | 4/2008 | King et al. | |
| 7,453,855 B1 | 11/2008 | Madhow | |
| 7,603,479 B2 * | 10/2009 | Shand et al. | 709/238 |
| 7,706,797 B2 * | 4/2010 | Henttonen et al. | 455/436 |
| 7,778,606 B2 * | 8/2010 | Ammon et al. | 455/67.11 |
| 2003/0198305 A1 | 10/2003 | Taylor et al. | |
| 2005/0111405 A1 | 5/2005 | Kanterakis | |

(Continued)

OTHER PUBLICATIONS

Habib et al. "Multi-antenna techniques for OFDM based WLAN." Proceedings of First International Conference on Next-Generation Wireless Systems, Jan. 2006, pp. 186-190.

(Continued)

*Primary Examiner* — Tuan H Nguyen
(74) *Attorney, Agent, or Firm* — Law Office of Dorian Cartwright

(57) ABSTRACT

A set of techniques includes devices, methods, and user interfaces, capable of conducting proactive automated tests of a wireless system, and capable of operating while the wireless system is conducting its normal operations. A diagnostic device not controlled by the wireless system controls drivers and clients in that wireless system's access points, with the effect that the diagnostic device can inject message traffic into the wireless system while simulating clients of that system. The wireless system responds to that traffic and those simulated clients as if real clients were generating substantially real traffic for the system to handle. The diagnostic device can initiate messages from within that wireless system, can force those messages to traverse selected trajectories in that system, and can measure aspects of that system in response to those messages. Trajectories might include specific wireless devices, specific wireless parameters, and specific physical paths.

25 Claims, 2 Drawing Sheets

U.S. PATENT DOCUMENTS

2005/0152314 A1 7/2005 Sun et al.

OTHER PUBLICATIONS

Kitahara et al. "A base station adaptive antenna for downlink transmission in a DS-CDMA system." IEEE 51st Vehicular Technology Conference Proceedings, 2000. (Abstract).

Mahler et al. "Design and optimisation of an antenna array for WiMAX base stations." IEEE/ACES International Conference on Wireless Communications and Applied Computational Electromagnetics, 2005. (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000. (Abstract).

Ponnapalli et al. "Design and packaging of antennas for wireless systems." Proceedings of Electrical Performance of Electrical Packaging, 1995. (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

* cited by examiner

DIAGNOSTIC STRUCTURE FOR WIRELESS NETWORKS

CROSS REFERENCE TO RELATED APPLICATION

This application is a Continuation-In-Part of U.S. application Ser. No. 12/208,924, titled "Wireless Diagnostics," which was filed Sep. 11, 2008, in the name of Vaduvur Bharghavan, and is hereby incorporated by reference as if fully set forth herein.

BACKGROUND

Wireless networks can be subject to a number of problems. These can include scope of wireless access coverage, proper operation of access points, connectivity or handoff between access points, and other problems. Typically, problems are discovered by a user of the system, who reports the problem. It can be complicated or difficult to re-create the problem, or if the problem is a due to a transient effect, the problem might have disappeared before attempts are made to discover its cause and any possible solutions.

If network administrators were willing to invest sufficient resources, it might be possible to identify problems using large numbers of diagnostic client devices. While this approach might achieve the purpose of identifying problems, it is likely to be economically infeasible, and might introduce its own problems, such as due to the number of client devices using the network. Moreover, it would not identify problems any earlier than they occur, after which it might still be complicated or difficult to re-create the problem, or if the problem is a due to a transient effect, the problem might have disappeared.

SUMMARY OF THE DESCRIPTION

A set of techniques includes devices, methods, and user interfaces, capable of conducting proactive automated tests of a wireless system, and capable of operating in a computational background mode, on a substantially continual schedule, while the wireless system is conducting its normal operations. A diagnostic device not controlled by the wireless system controls drivers and clients in that wireless system's access points, with the effect that the diagnostic device can inject message traffic into the wireless system while simulating clients of that system. The wireless system responds to that traffic and those simulated clients as if real clients were generating substantially real traffic for the system to handle. The diagnostic device can initiate messages from within that wireless system, can force those messages to traverse selected trajectories in that system, and can measure aspects of that system in response to those messages. Trajectories might include specific wireless devices (e.g., access points), specific wireless parameters (e.g., message coding, transmit speed, or channel), specific physical paths (e.g., requiring the message to traverse a selected spatial region by selecting the order of access points it is sent to), or other features.

The diagnostic device can use existing wireless system infrastructure substantially without disruption of that system's service activities, and substantially without addition of hardware elements to that system. The diagnostic device directs the wireless system's virtual clients to inject traffic into the system. This injected traffic might be subject to problems in the wireless system, or might cause problems in the wireless system, with the effect that the diagnostic device can identify those problems substantially as they occur. For example and without limitation, the diagnostic device can identify transient problems at those times those transient problems are reportable and testable. The virtual clients controlled by the diagnostic device appear to that wireless system as if they were real clients operating within that system. This has the effect that the diagnostic device can test particular parameters, or combinations or variations thereof. For example and without limitation, the diagnostic device can direct those virtual clients to emulate particular devices, or types of devices, which might be disposed to communicate with the wireless system. Those virtual clients can be rapidly reconfigured and retested under control of the diagnostic device, without any substantial need for reconfiguring or coupling new hardware to the wireless system.

DETAILED DESCRIPTION

Nature of the Description

Read this application in its most general form. This includes, without limitation:

- References to specific structures or techniques include alternative or more general structures or techniques, especially when discussing aspects of the invention, or how the invention might be made or used.
- References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
- References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.
- References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

TERMS AND PHRASES

The general meaning of each of these terms or phrases is illustrative, not in any way limiting:

The phrase "access point", and variants thereof, generally refers to any device capable of being coupled to one or more mobile stations and capable of being coupled to a non-wireless medium. Access points might be coupled directly to a non-wireless medium, e.g., using copper wire or other signal-carrying media, or might be coupled indirectly, e.g., using wireless communication to other devices (possible other access points) which are themselves coupled, directly or indirectly, to a non-wireless medium. Although this application provides greater detail regarding embodiments in which access points primarily operate using an IEEE 802.11 protocol, there is no particular reason to limit any part of this application in this regard.

The phrases "wireless network", "wireless system", and variants thereof, generally refers to any communication or computing system in which data are transmitted, received, or maintained using a wireless medium. Although this application provides greater detail regarding embodiments in which wireless systems use an IEEE 802.11 protocol, there is no particular reason to limit any part of this application in this regard.

The phrase "OSI network layers", and variants thereof, generally refers to a definition of network layers, including L1 (physical layer), L2 (link layer), and L3 (network layer). At least one known OSI layering standard exists.

The phrase "IEEE 802.1x", and variants thereof, generally refers to a framework for authenticating and controlling user traffic to a protected network, as well as dynamically varying encryption keys. The IEEE 802.1x standards, among other things, tie EAP to both the wired and wireless LAN media and support multiple authentication methods (e.g., token cards, Kerberos, one-time passwords, certificates, and public key authentication). Although the invention is described primarily with respect to IEEE standards, in the context of the invention, there is no particular reason to limit any part of this application in this regard. For example and without limitation, any L2 or L3 security protocol would be workable, and use thereof is within the scope and spirit of the invention.

The phrase "diagnostic device", and variants thereof, generally refers to any device capable of obtaining, and possibly presenting or transmitting, information about a wireless system gleaned from observation of that wireless system without necessarily being coupled thereto.

The term "trajectory", and variants thereof, generally refers to any selected path (or set of paths) selected for a message to follow. For example, without limitation, a trajectory might specify that a message be generated at access point "A", be sent to access point "B" on channel 1 at 36 Megabits/second, and then be sent to the diagnostic device using the virtual tunnel. It might often occur that a trajectory is not the natural path a message would follow in normal use of the wireless system.

The phrase "virtual client", and variants thereof, generally refers to any element, hardware or software, which emulates, or which presents the appearance of, a wireless station (e.g., a mobile station) to a wireless system. Virtual clients might present the appearance of any one of a variety of devices, using any one of a variety of modes of operation. For example and without limitation, a particular virtual client might be capable of presenting the appearance of an IEEE 802.11n wireless device, or of presenting the appearance of IEEE 802.11a, 11b, or 11g devices.

FIGURES AND TEXT

Figure 1:
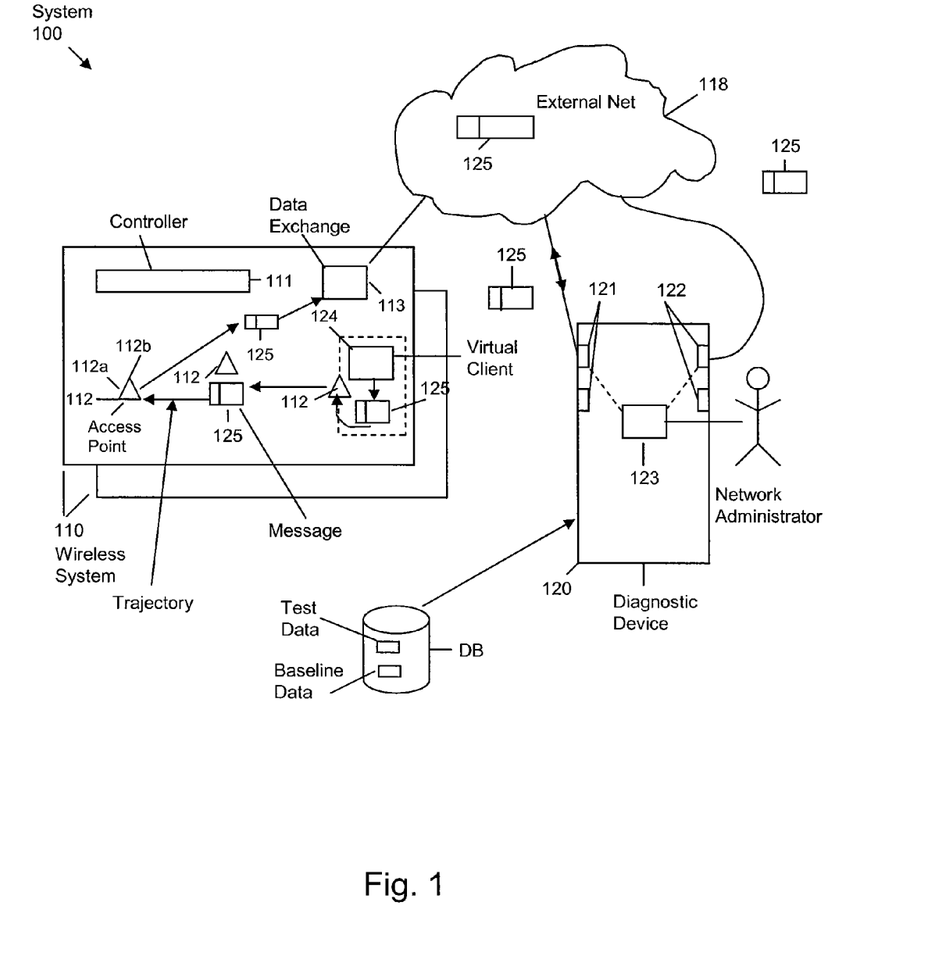
FIG. 1 illustrates a block diagram of a system, according to an embodiment.

FIG. 1

A system 100 includes elements shown in the FIG. 1, including at least: one or more wireless systems 110 (sometimes referred to herein as "wireless communication systems" or "wireless networks"), and a diagnostic device 120 (sometimes referred to herein as a "diagnostic server").

Each wireless system 110 includes elements shown in the FIG. 1, including at least: one or more controllers in (sometimes referred to herein as "control elements" or a "wireless network controllers"), one or more access points 112, each possibly having a plurality of radios 112a and 112b, and one or more mobile stations (not shown). Typically, the mobile stations would exchange messages with the access points 112, and the access points 112 would provide for delivery of those messages at least to an intermediate exchange point 113 (such as an Internet router), which is coupled to an external network 114.

1 Diagnostic Device

The diagnostic device 120 includes elements as shown in the FIG. 1, ineluding at least: one or more control ports 121, one or more data ports 122, one or more control elements 123 (each including at least a processor and program and data memory or mass storage, not shown in the FIG. 1).

Each control port 121 is disposed to communicate with one or more of the set of access points 112, and is capable of exchanging commands and data with those one or more access points 112. The diagnostic device 120 operates, in conjunction with an access point 112, to inject (or remove) a virtual client 124 on that access point 112. The virtual client 124 includes a process or thread capable of executing on the access point 112 separately from other processes or threads concurrently operating on that access point 112, under control of program memory or mass storage (not shown), and making use of data memory or mass storage (not shown).

As described herein, the virtual client 124 operates within the access point 112, without disrupting other processes or threads within that access point 112. The virtual client 124 operates to inject messages 125 into the wireless system 110. These messages 125 are received by other processes or threads at an originating access point 112, forwarded via a trajectory of one or more access points 112 to one or more control elements 111, and delivered to the intermediate exchange point 113. The intermediate exchange point 113 receives those messages 125, and forwards them—using the external network 114 such as the Internet—to their stated destination, which is one of the data ports 122 on the diagnostic device 120.

For example and without limitation, the virtual client 124 and the diagnostic device 120 might include, one or more of, or some combination or conjunction of, the following: (1) between the access point 112 and the diagnostic device 120, an Ethernet over IP dataplane tunnel; and (2) at its access point 112, a modified radio driver for the access point's 112 radio 112a, 112b. The virtual client 124 and the diagnostic device 120 might also include scripting commands at one or the other or both, and might also include a communication control plane signaling demon with at least two particular instances, one at the virtual client 124 and one at the diagnostic device 120.

Communication between the wireless controller 111 and the diagnostic device 120 might be conducted using an external network, e.g., the Internet. For example and without limitation, such communication might use Ethernet over IP dataplane tunneling, UDP over IP control plane message signaling, or might use a separate wireless system 110, or might use some other technique.

Each data port 122 is disposed to communicate with the external network 114, and for exchanging data with that external network 114.

Effective Message Loop

This has the effect that the message 125 effectively makes a complete loop:

- from the diagnostic device 120 (at a control port 121) injecting the virtual client 124 onto the access point 112;
- from the virtual client 124 injecting the message 125 into the wireless system 110 at an originating access point 112;
- from that originating access point 112 via a trajectory of one or more access points 112 to one or more control elements 111;
- from those one or more control elements 111 to the intermediate exchange point 113; and
- from the intermediate exchange point 113 via the external network 114 to the diagnostic device 120 (at a data port 122).

Since the diagnostic device 120 originally injected the virtual client 124 onto its particular access point 112, the diagnostic device 120 knows the MAC address of that virtual client 124. This has the effect that the diagnostic device 120 can identify which messages 125 are from virtual clients 124, by examination of the MAC address portion of each such message 125. Although this application primarily describes the diagnostic device 120 identifying each such message 125 by the MAC address of its virtual client 124, in the context of the invention, there is no particular reason to limit any part of this application in this regard.

The diagnostic device 120, having identified such messages 125, and being able to identify from which virtual client 124 they originate, has the ability to gather detailed information about the transfer of each such message 125 from its virtual client 124 to the data port 122 of the diagnostic device 120. Similarly, the diagnostic device 120 can send messages 125 from one or more of its own data ports 122, designating particular individual virtual servers 124 as the recipients thereof. This has the effect that the diagnostic device 120 has the ability to gather detailed information about transfer of each such message 125 in the reverse direction, i.e., from the data port 122 of the diagnostic device 120 to the virtual client 124.

The diagnostic device 120 controls both endpoints of each of these loops. The diagnostic device 120 controls the virtual client 124, such as by sending command messages 125 to that virtual client 124 from one or more of its control ports 121. The diagnostic device 120 also controls its own data port 122. This has the effect that the diagnostic device 120 can deterministically find out whether there are any problems encountered during the path taken by the message 125.

- For a first example and without limitation, the diagnostic device 120 can deterministically find out whether there are any connectivity problems between the virtual client 124 and the data port 122, through the designated trajectory, e.g., by noting whether any of those such messages 125 has an unusual number of dropped packets or other portions.
- For a second example and without limitation, the diagnostic device 120 can deterministically find out whether there are any latency problems between the virtual client 124 and the data port 122, through the designated trajectory, e.g., by noting whether any of those such messages 125 is delayed by an unusually large amount of time.
- For a third example and without limitation, the diagnostic device 120 can deterministically find out whether there are any throughput problems between the virtual client 124 and the data port 122, through the designated trajectory, e.g., by noting whether there is a bandwidth, capacity, QoS, or other throughput limitation on a stream of such messages 125.

Diagnostic Operations

This has the effect of allowing for a wide range of diagnosis operations. For example, and without limitation, these operations might include one or more of, or a combination or conjunction of, the following:

- The diagnostic device 120 might initiate a test, including signaling a chosen access point 112 to set up a radio endpoint of a virtual client 124, telling that access point 112 a set of L2 connectivity parameters needed for communication, for example, channel, ESSID or BSSID, security mode, and psk-key, or enterprisemode EAP parameters. For example and without limitation, the 802.1x and Radius components to implement full steps to form L2 connectivity can run in the diagnostics server.
- When an L2 (or other relatively lower OSI layer) is ready, the virtual client 124 presents its assigned state to the network 110. The diagnostics server 120 proceeds by setting a network- and application-layer test, by launching a DHCP client for L3 IP address and other network interface parameter provisioning.
- When an L3 (or other relatively higher OSI layer), the diagnostic device 120 might launch a client-server application such that its client component communicates over the virtual interface with the diagnostics client radio, and its server side communicates over the physical interface of the diagnostics server's network interface. For example, a Ping test would send an ICMP echo request packet over the virtual interface which tunnels the Ethernet frame to the radio part of the diagnostics client, this sends it over the air to an access point radio in a neighboring access point of the wireless system under diagnosis, and the wireless system passes the packet to the wired network from where IP routing brings it back to the server via the native wire-line IP. The server side (IP stack in this example) responds to the ICMP echo request by sending an ICMP echo reply via the same route back to the Ping client.

A trajectory can include a set of services (ESSIDs) over one radio in a set of access points (in a "controller-handoff" wireless system 110), or a set of ESSIDs from every radio in a set of access points (in a "virtual cell" wireless system 110). Examples of both "controller-handoff" wireless systems 110 and "virtual cell" wireless systems 110 are shown in U.S. application Ser. No. 11/715,287, filed Mar. 7, 2007, in the name of inventors Vaduvur Bharghavan, Sung-Wook Han, Joseph Epstein, Berend Dunsbergen, and Saravanan Balasubramanian, titled "Seamless Mobility in Wireless Networks,". This has the effect that a trajectory can specify an ordered sequence of access points through which a message should pass as it proceeds between the virtual client 124 and the diagnostic device 120.

After reading this application, those skilled in the art will recognize that the diagnostic device 120 need not restrict itself to testing for connectivity (or lack of connectivity). The diagnostic device 120 might also or instead check for any one of, or some combination or conjunction of, the following:

- For a first example and without limitation, the diagnostic device 120 can deterministically find out whether there are any connectivity problems between the virtual client 124 to the diagnostic device 120 using the designated trajectory, e.g., by noting whether any of those such messages 125 has an unusual number of dropped packets or other portions.
- For a second example and without limitation, the diagnostic device 120 can deterministically find out performance information about the wireless system 110 for paths between the virtual client 124 to the diagnostic device 120 itself, such as one or more such designated trajectories. Performance information might include throughput, bit error rate, latency, jitter (variance of latency), or otherwise. In VoIP applications, it might occur that a first codec used with an application might tolerate less or more jitter than a second such codec.

For a third example and without limitation, the diagnostic device 120 can collect per-station per-connection and per-event diagnostic data, either from its controller end, from the virtual client 124, or both. In those cases in which there is unusual behavior, the diagnostic device 120 might then infer a probable cause for each set of diagnostic data, e.g., using inference rules.

Statistical Reports

The diagnostic device 120 gathers detailed information on events that occur during the transfer of each such message 125, e.g., a trace of all locations the message 125 touched during its trajectory, as well as detailed information about each such location (e.g., bandwidth, bit error rate, dropped packets, latency, QoS, trace information, and other information). This has the effect that the diagnostic device 120 can determine statistics useful by network administrators and other authorized personnel, relating to normal operation of the wireless system 110, relating to any error or fault in operation, relating to operation of the wireless system 110 in response to an error, and other information.

In response to this information, the diagnostic device 120 has the ability to pinpoint where any particular error occurred, and what were the circumstances that led to the error.

Background Sweeps

The diagnostic device 120, being a programmable device, also has the capability of conducting tests using such messages 125 from time to time. These might be any one of, or some combination or conjunction of, the following:
 at the direction of a network administrator;
 upon the occurrence of a specific event;
 upon the triggering of a timer;
 periodically (e.g., once per minute);
 continuously
 other circumstances In the case of continuous operation, the virtual client 124 operates at a relatively lower level of priority (sometimes also called "background" operation herein) for computation and memory resources, at each access point 112 at which one or more such virtual clients 124 have been injected by the diagnostic device 120, and the messages 125 exchanged between each such virtual client 124 and the diagnostic device 120 operate at a relatively lower level of priority or QoS, at each access point 112 in the trajectory of such access points 112. While the invention is described in this application primarily with respect to operating at a relatively lower level of priority, in the context of the invention, there is no particular reason this application in any such way.

For example and without limitation, the virtual client 124 or the diagnostic device 120 might operate at a relatively normal or even a relatively higher level of priority from time to time. This might occur at any one of, or some combination or conjunction of, the following:
 at the direction of a network administrator;
 upon the occurrence of a specific event (e.g., when an error occurs, or when the wireless system 110 appears to be in an abnormal state);
 upon the triggering of a timer, or periodically (e.g., a relatively normal or relatively higher priority sweep once per minute, with relatively lower priority operation in continuous mode;
 other circumstances Generality of Possible Tests The diagnostic device 120, having control of both ends of the loop connection (identifiable at the MAC layer and validated through the wireless system 110 at the L2 or L3 layer), has the ability to conduct a wide variety of tests, such as tests at each level of the OSI model, tests of each particular radio 112*a*, 112*b* at any particular access point 112, tests of each particular connection between access points 112, or between access points 112 and the wireless controller in, and other possibilities.

The diagnostic device 120 also has the ability to test any particular service, or combination or conjunction of services. For a first example and without limitation, the diagnostic device 120 can test the IP "ping" connectivity test or the VoIP "MOS Score" connectivity test. For a second example and without limitation, the diagnostic device 120 can test voice, video, CAD downloads or MRI downloads, or active directory requests, or any other wireless system 110 behavior that network administrators or other authorized personnel wish to validate or otherwise test.

The diagnostic device 120 also has the ability to cause the virtual client 124 to emulate particular devices. For example and without limitation, if network administrators or other authorized personnel wish to determine how the wireless system 110 is reacting to Spectralink telephones (or another particular type of device), the diagnostic device 120 causes the virtual client 124 to behave as if it were one of those devices. The diagnostic device 120 has the ability to determine and report the nature of behavior of the wireless system 110 in conjunction with that particular type of device.

Combinatorial Sweeps

The diagnostics server 120 might also perform testing involving one or more combinations or conjunctions of testing parameters. For example and without limitation, in a case where there are three possible trajectories and three possible services, the diagnostics server 120 might perform testing for each of the three×three=nine possible combinations. Similarly, in a case where there are multiple possible trajectories, services, bandwidths, frequencies, or other factors which might be specified by the diagnostics server 120, the diagnostics server 120 might test the entire set of possibilities, or some subset thereof.

After reading this application, those skilled in the art would recognize that the diagnostic device 120 might perform multiple tests in series, in parallel, or some combination or conjunction thereof. For a first example and without limitation, in a case where one combination of possible parameters does not interfere with a second such combination, the diagnostics server 120 might test both concurrently, or might test them in series. For a second example and without limitation, in a case where that one such combination does interfere with that second such combination, the diagnostics server 120 might test both in series, with the effect of avoiding such interference, or might test both concurrently, with the effect of determining the nature and degree of any such interference. The diagnostic device 120 might record information it finds or computes in one or more databases for review.

One possibility is that the diagnostic device 120 determines, for the wireless system 110, a set of "normal" behavior, including steps of comparing results of one or more such tests with a reference or baseline set of results. The reference or baseline set of results might have been measured manually, e.g., by moving a wireless station through the wireless system 110 and making those one or more such tests. Multiple manual tests might be made, and a median result, or a best result, or some other percentile result, might be taken as indicative of "normal" operation.

The diagnostic device 120, in combination and conjunction with one or more of its virtual clients 124, might perform testing in multiple wireless networks 110, which might or might not overlap in physical or electromagnetic scope.

Similarly, the diagnostic device 120, in combination and conjunction with one or more of its virtual clients 124, might perform testing of multiple applications or variation of other station-specific parameters. For example and without limitation, the diagnostic device 120 might perform testing of parameters such as one or more of, or some combination or conjunction of, the following:

- over-the-air parameters having a possible effect on any management frame protocol. For example and without limitation, the diagnostic device 120 might test (a) whether probe requests are directed or non-directed, (b) whether a powersave protocol remains in power-save mode or switches between active and powersave mode, (c) whether the stack attempts to use block-ACK's, or (d) what EAP methods are supported for WPA2-enterprise exchange.
- network-layer parameters having a possible effect on any IP control traffic, such as (a) whether the virtual client 124 sends unicast, multicast, or broadcast DHCP request messages.
- application-layer parameters having a possible effect on any application, such as (a) what audio codecs are preferred or supported for VoIP media streams, (b) accepted jitter variance in latency before VoIP audio receivers drops voice packets, or (c) whether VoIP media streams propagate over IP in a unicast or a multicast mode, or un-encrypted or encrypted.
- timer parameters and variations in any OSI layer, such as (a) what number of DHCP requests the virtual client 124 performs before conducting DHCP discovery to obtain a new IP address, (b) variations in tolerated wait periods or retry counts, (c) variation in timing of background scan for channels, and otherwise.

After reading this application, those skilled in the art would recognize that controlling one or more client-specific parameters allows the virtual client 124 and the diagnostic device 120 to emulate and discover client-specific problems.

Remote Monitoring

After reading this application, those skilled in the art would recognize that network administrators or other authorized personnel might monitor the wireless system 110 either logically or physically remotely, or some combination or conjunction thereof. This has the effect that the diagnostic device 120, operating at the behest of network administrators or other authorized personnel would be able to perform any one of, or some combination or conjunction of, the following:

- determine whether the wireless system 110 is in "good health", or if there are any problems which should be addressed;
- determine, in such cases where there are one or more such problems, the logical or remote location of those one or more problems, and in such cases where there are one or more such problems, recording the fact of those one or more problems in a log file, or otherwise;
- notifying, in such cases where there are one or more such problems, one or more such network administrators or other authorized personnel of (a) the existence of the problem, (b) the nature and scope of the problem, (c) any particular system parameters associated with the problem, (d) the beginning and duration of the problem, and otherwise. For example and without limitation, the diagnostic device 120 might notify such network administrators or other authorized personnel by email, by pager, by SMS, by IM, or otherwise. The diagnostic device 120 might similarly generate reports.

Figure 2:
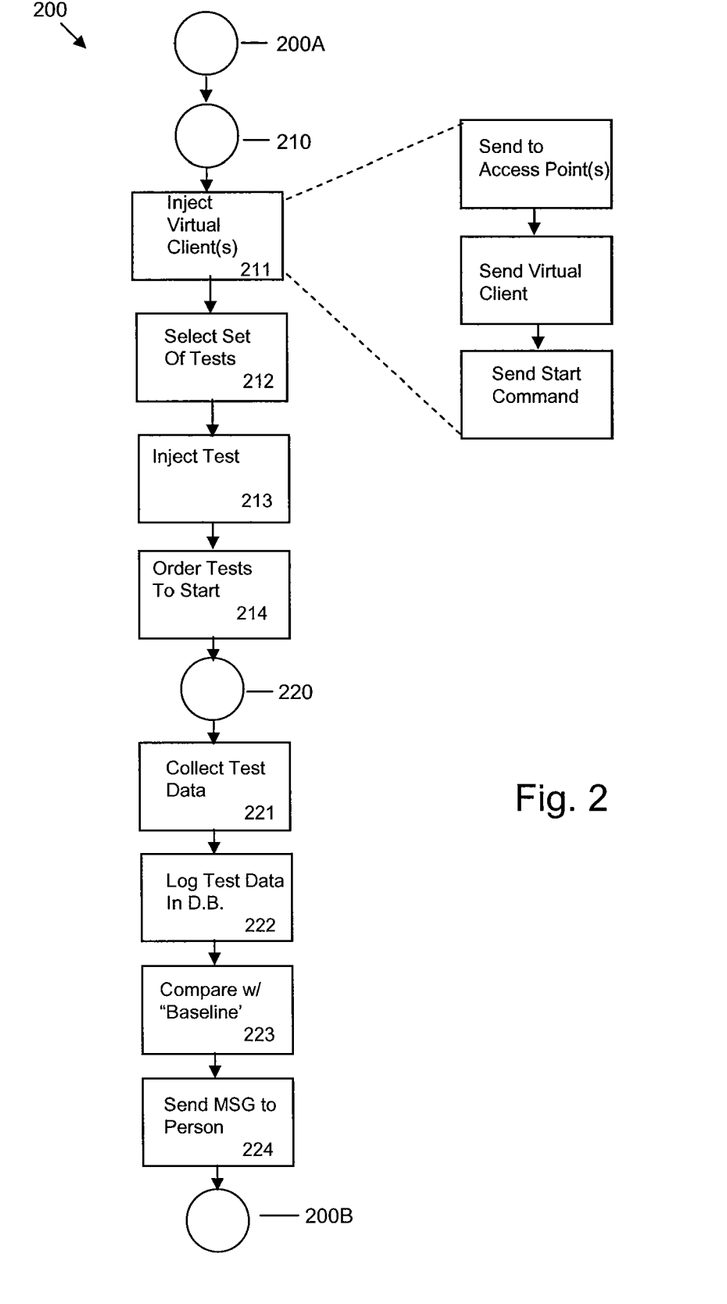
FIG. 2 illustrates a block diagram of a system, according to an embodiment.

FIG. 2

FIG. 2 shows a conceptual diagram of a method.

A method 200 includes a set of flow labels and method steps as shown in the FIG. 2, including at least the following:

Reaching a flow label 200A indicates a beginning of the method 200.

Virtual Client

Reaching a flow label 210 indicates the method 200 is ready to operate with one or more wireless systems 110 and the diagnostic device 120. After reading this application, those skilled in the art would recognize that the system 100 might be brought into the state associated with the flow label 210, if not already in that state.

At a step 211, the diagnostic device 120 injects one or more virtual clients 124 into one or more wireless systems 100. Although this application provides description primarily with respect to a single virtual client 124 injected into a single wireless system 110, in the context of the invention, there is no particular reason for the invention to be limited in any such way. To perform this step, the diagnostic device 120 performs the following sub-steps:

- The diagnostic device 120 sends one or more messages to a selected access point 112 in the wireless system 110, those messages being interpreted by that selected access point 112 as command messages, those command messages directing that selected access point 112 to receive a virtual client 124 for execution at the selected access point 112.
- The diagnostic device 120 sends one or more messages to the selected access point 112, those messages being interpreted by that selected access point 112 as data messages, those data messages including instructions for the selected access point 112 to execute when emulating the virtual client 124.
- The diagnostic device 120 sends one or more messages to the selected access point 112, those messages being interpreted by that selected access point 112 as command messages, those command messages including instructions to the selected access point 112 to execute the virtual client 124.

As described herein, the virtual client 124 might emulate any one or more of a wide range of possibilities. For example and without limitation, the virtual client 124 might emulate a Spectralink device. As described herein, the virtual client 124 might also emulate other devices, either separately, concurrently, or in some manner to interleave operation in each of multiple modes.

At a step 212, the diagnostic device 120 selects a set of tests to be performed on the wireless system 110, those tests including one or more of, or some combination or conjunction of, tests described herein, or other tests. As described herein, those tests might involve specific applications or protocols for messages, specific parameters selected for messages, specific trajectories for messages, and otherwise, and those tests might be able to be conducted serially or in parallel or some combination or conjunction thereof.

To inject that set of tests, in an order selected by a network administrator or other personnel, the diagnostic device 120 might include a set of scripted commands, e.g., a saved list of commands to be executed by a command terminal, top-level shell, or other command input. To perform that set of tests, in the order directed by the diagnostic device 120, the virtual client 124 might include a set of scripted commands, e.g., a saved list of commands to be executed by a command terminal, top-level shell, or other command input.

As described herein, those tests might include emulating any one or more of a set of particular devices. Those test might, also or instead, include the designation of specific trajectories for selected messages. As described herein, when a message is determined to take a specific trajectory, the message is passed from access point 112 to access point 112 along the specified trajectory.

In a wireless system 110 having one or more virtual cells, as described in the incorporated disclosure, the wireless system 110 might respond to the specified trajectory by passing the message from access point 112 to access point 112 as if a client device were moving so as to change its (the client device's) designated access point 112 from one to another along the designated trajectory.

In a wireless system 110 having one or more regions using controller-handoff, as described herein, and as otherwise and further described in the incorporated disclosure, the wireless system 110 might respond to the specified trajectory by by passing the message from access point 112 to access point 112 as if a client device were moving so that the controller in directed the access points 112 to handoff the client device from one to another along the designated trajectory.

At a step 213, the diagnostic device 120 injects those tests to be performed into the virtual client 124, to the extent necessary for the virtual client 124 to behave as designated by those tests.

At a step 214, the diagnostic device 120 directs the selected access point 112 to cause the virtual client 124 to execute those tests, as described here, serially or in parallel or some combination or conjunction thereof.

Test and Measurement

Reaching a flow point 220 indicates that the virtual client 124 and the diagnostic device 120 are performing the tests to be performed.

At a step 221, concurrently with performing those tests, the diagnostic device 120 collects test data regarding those tests. For example and without limitation, in response to connectivity tests for selected trajectories, the diagnostic device 120 might collect connectivity information for those selected trajectories, while in response to parameter tests for the wireless system 110, the diagnostic device 120 might collect parameter information (e.g., average throughput for the wireless system 110, maximum data transfer rate for multiple concurrent trajectories in the wireless system, and other information.

At a step 222, the diagnostic device 120 logs the collected test data in one or more databases, those databases being logically or physically local or remote.

At a step 223, the diagnostic device 120 compares the collected test data with a record of normal data, sometimes called "baseline" data herein, with the effect of determining whether the collected test data is unusual in any notable way. If not, the method 200 orders new tests and proceeds with the flow point 220. If so, the method 200 continues with the step 224.

For one example and without limitation, "baseline" data might be collected by one or more of, or some combination or conjunction of, the following:

a set of data indicative of behavior asserted to be normal, or
a set of data indicative of behavior asserted to be unusual, input from a data source, a network administrator or other personnel;

a set of data responsive to manual measurement of the wireless system 110, e.g., data obtained by having a technician or other personnel walk a mobile wireless station through selected regions of the wireless system 110;

a set of data responsive to earlier operation of the wireless system 110, e.g., a set of data indicative of a history of measurements of the wireless system 110; or other data relevant to baseline data.

It might be expected that the data above, or some combination or conjunction thereof, might be distributed over a set of possibilities, e.g., throughput might vary from time to time. Baseline data might be determined responsive to such a set of possibilities by taking a best case, worst case, median case, selected percentile case (e.g., the 75% percentile, i.e., the border between the first and second quartiles), or some combination or conjunction thereof.

At a step 224, the diagnostic device 120 sends one or more messages to network administrators or other authorized personnel. As described here, the messages might include email, telephone call (e.g., with a recorded message selected in response to the nature of the detected anomaly), telephone page, SMS, Instant Message, or otherwise.

Reaching a flow label 200B indicates an end of the method 200.

As described herein, the diagnostic device 120 and the virtual client 124 operate continually within the wireless system 110, at a background level of priority (with possible exceptions). This has the effect that the wireless system 110 is proactively monitored for any unusual behavior, which has the following effects:

Detection of errors and mis-operational or broken devices can occur near immediately, as those errors or broken devices are likely to affect diagnostic tests as those tests are performed, allowing the diagnostic device 120 to inform network administrators and other personnel very soon after those errors occur.

Detection of mal-operational devices (e.g., rogue access points 112) and malware (e.g., software viruses, spyware, DDOS attacks, and otherwise) can also occur near-immediately, as those mal-operational devices and malware are likely to affect diagnostic tests as those tests are performed, or soon thereafter. For example and without limitation, the existence of a rogue access point 112 would not affect any particular trajectory by breaking that trajectory, but it might very quickly one or more trajectories nearly immediately by placing additional load on the access points 112 in that trajectory.

Detection of devices and software that do not cooperate within operation of the wireless system 110 can also occur near-immediately, as that failure to cooperate would likely lead to unnecessary additional messages, reducing throughput and otherwise affecting operation of the wireless system 110. For a first example and without limitation, it might occur that some one or more manufacturer produces a device which operates poorly with access points 112. If so, the effect on those access points 112 would be detectable. For a second example and without limitation, it might occur that some first one or more devices or software operates well by itself, but when operating within the wireless system 110 concurrently with a second one or more devices or software, does not operate well, i.e., they do not cooperate. If so, the effect on the wireless system 110 would be detectable.

If the effect of any particular problem (e.g., an error, malfunction, maloperational device or software, or non-cooperation between otherwise properly operational devices and software), is not detectable by its effect on the wireless system, network administrators and other personnel might properly consider the lack of effect to be indicative of no particular need to address that particular problem.

ALTERNATIVE EMBODIMENTS

After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. A computer-implemented method, comprising:
    causing diagnostic packets to be sent through a wireless network to or from a virtual client, the virtual client comprising a process simulating a device connected to the wireless network without introducing additional physical devices in that wireless network;
    configuring the diagnostic packets for routing through the wireless network over a predetermined trajectory that includes the virtual client and a diagnostic device;
    receiving the diagnostic packets; and
    examining the diagnostic packets to identify an abnormality associated with the predetermined trajectory.

2. The method of claim 1, wherein the causing the diagnostic packets to be sent comprises causing the diagnostic packets to be sent through the wireless network without disrupting service of the wireless network.

3. The method of claim 1, wherein the examining the diagnostic packets comprises examining the diagnostic packets during operation of the wireless network.

4. The method of claim 1, wherein the causing the diagnostic packets to be sent through the wireless network occurs continuously as a background process during operation of the wireless network.

5. The method of claim 1, wherein the abnormalities associated with the predetermined trajectory comprises at least one of connectivity abnormality, throughput abnormality, and latency abnormality.

6. The method of claim 1, wherein the predetermined trajectory comprises a specific path through an ordered set of access points among a plurality of potential paths between the virtual client and the diagnostic device.

7. The method of claim 1, wherein the predetermined trajectory implements testing of at least one of a particular level of the OSI model, a particular radio of an access point, a particular connection between access points, and a particular connection between an access point and a wireless controller.

8. The method of claim 1, wherein causing the diagnostic packets to be sent further comprises:
    causing diagnostic packets to be sent through the wireless network, the virtual client comprising a process simulating a particular type of device.

9. The method of claim 1, wherein causing the diagnostic packets to be sent further comprises:
    causing an access point to set up a radio end point of the virtual client by sending the access point a set of Layer-2 connectivity parameters needed for communication.

10. The method of claim 1, wherein the examining the diagnostic packets further comprises:
    gathering statistical information on locations traversed during transmission of the diagnostic packets, the statistical information comprising at least one of a location bandwidth, a location bit error rate, a location dropped packet rate, a location latency, and a location quality of service.

11. The method of claim 1, wherein the examining the diagnostic packets further comprises:
    gathering a trace of locations traversed by the diagnostic packets during transmission between the virtual client and the diagnostic device.

12. The method of claim 1, further comprising:
    gathering baseline information to use as a reference for examinations.

13. A non-transitory computer-readable medium containing a computer program product for, when executed by a processor, performing a method, the method comprising: causing diagnostic packets to be sent through a wireless network or from a virtual client, the virtual client comprising a process simulating a device connected to the wireless network without introducing additional physical devices in that wireless network; configuring the diagnostic packets for routing through the wireless network over a predetermined trajectory that includes the virtual client and a diagnostic device; receiving the diagnostic packets; and examining the diagnostic packets to identify an abnormality associated with the predetermined trajectory.

14. The computer-readable medium of claim 13, wherein the causing the diagnostic packets to be sent comprises causing the diagnostic packets to be sent through the wireless network without disrupting service of the wireless network.

15. The computer-readable medium of claim 13, wherein the examining the diagnostic packets comprises examining the diagnostic packets during operation of the wireless network.

16. The computer-readable medium of claim 13, wherein the causing the diagnostic packets to be sent through the wireless network occurs continuously as a background process during operation of the wireless network.

17. The computer-readable medium of claim 13, wherein the abnormalities associated with the predetermined trajectory comprises at least one of connectivity abnormality, throughput abnormality, and latency abnormality.

18. The computer-readable medium of claim 13, wherein the predetermined trajectory comprises a specific path through an ordered set of access points among a plurality of potential paths between the virtual client and the diagnostic device.

19. The computer-readable medium of claim 13, wherein the predetermined trajectory implements testing of at least one of a particular level of the OSI model, a particular radio of an access point, a particular connection between access points, and a particular connection between an access point and a wireless controller.

20. The computer-readable medium of claim 13, wherein causing the diagnostic packets to be sent further comprises:
    causing diagnostic packets to be sent through the wireless network, the virtual client comprising a process simulating a particular type of device.

21. The computer-readable medium of claim 13, wherein causing the diagnostic packets to be sent further comprises:
    causing an access point to set up a radio end point of the virtual client by sending the access point a set of Layer-2 connectivity parameters needed for communication.

22. The computer-readable medium of claim 13, wherein the examining the diagnostic packets further comprises:
    gathering statistical information on locations traversed during transmission of the diagnostic packets, the statistical information comprising at least one of a location bandwidth, a location bit error rate, a location dropped packet rate, a location latency, and a location quality of service.

23. The computer-readable medium of claim 13, wherein the examining the diagnostic packets further comprises:
   gathering a trace of locations traversed by the diagnostic packets during transmission between the virtual client and the diagnostic device.

24. The computer-readable medium of claim 13, further comprising:
   gathering baseline information to use as a reference for examinations.

25. An system, the system comprising a diagnostic device to initiate diagnostic testing; and an access point to, responsive to the diagnostic device, to send diagnostic packets through a wireless network or from a virtual client, the virtual client comprising a process simulating a device connected to the wireless network without introducing additional physical devices in that wireless network, wherein the diagnostic packets are configured for routing through the wireless network over a predetermined trajectory that includes the virtual client and a diagnostic device, wherein the diagnostic device receives the diagnostic packets, and examines the diagnostic packets to identify an abnormality associated with the predetermined trajectory.

* * * * *